(12) United States Patent
Fujiwara

(10) Patent No.: US 8,602,931 B2
(45) Date of Patent: Dec. 10, 2013

(54) SEAL CHAIN

(75) Inventor: Makoto Fujiwara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 206 days.

(21) Appl. No.: 13/079,059

(22) Filed: Apr. 4, 2011

(65) Prior Publication Data

US 2011/0263368 A1   Oct. 27, 2011

(30) Foreign Application Priority Data

Apr. 27, 2010 (JP) ................................ 2010-102233

(51) Int. Cl.
*F16G 13/02* (2006.01)
*F16J 15/34* (2006.01)
*F16J 15/32* (2006.01)

(52) U.S. Cl.
USPC .......................................... 474/206; 277/353

(58) Field of Classification Search
USPC ........... 474/206, 207; 277/353, 551, 572, 577
See application file for complete search history.

(56) References Cited

U.S. PATENT DOCUMENTS

| | | | | |
|---|---|---|---|---|
| 2,411,207 A * | 11/1946 | Hait | ............................... | 403/152 |
| 2,411,214 A * | 11/1946 | Keech | ............................ | 403/150 |
| 3,135,128 A * | 6/1964 | Rudolph | ....................... | 474/207 |
| 3,492,885 A * | 2/1970 | Nolte | ................................ | 474/91 |
| 4,201,393 A * | 5/1980 | Kawashima et al. | ......... | 277/395 |
| 4,464,151 A * | 8/1984 | Kahl | .............................. | 474/231 |
| 5,269,729 A * | 12/1993 | Thuerman et al. | ............ | 474/207 |
| 5,943,855 A * | 8/1999 | Morimoto et al. | .................. | 59/5 |
| 7,467,509 B2 * | 12/2008 | Yamane et al. | ..................... | 59/4 |
| 2003/0167749 A1 * | 9/2003 | Garbagnati et al. | ................ | 59/4 |
| 2006/0284483 A1 * | 12/2006 | Komeya | ......................... | 305/103 |
| 2008/0061512 A1 * | 3/2008 | Yamane et al. | ............... | 277/345 |
| 2009/0301842 A1 * | 12/2009 | Ono | ............................. | 198/500 |

FOREIGN PATENT DOCUMENTS

| | | |
|---|---|---|
| JP | 2005-076681 | 3/2005 |
| JP | 2005-083429 | 3/2005 |
| JP | 2008-157423 | 7/2008 |
| JP | 2009-115138 | 5/2009 |

\* cited by examiner

*Primary Examiner* — William A Rivera
*Assistant Examiner* — Henry Liu
(74) *Attorney, Agent, or Firm* — Howson & Howson LLP

(57) ABSTRACT

In a seal chain, a seal mechanism comprises a pair of mutually facing seal members, a first seal member of the pair being in contact with an inner plate of the chain, and a second seal member of the pair being in contact with an outer plate of the chain. A pair of resilient annular lips formed on the first seal member are in sliding contact with a surface of the second seal member. Each sealing member has lubricant-filled grooves facing the plate with which it is in contact.

8 Claims, 6 Drawing Sheets

SEAL CHAIN

CROSS REFERENCE TO RELATED APPLICATION

This application claims priority on the basis of Japanese Patent Application 2010-102233, filed on Apr. 27, 2010. The disclosure of Japanese Patent Application 2010-102233 is incorporated by reference.

FIELD OF THE INVENTION

This invention relates to a seal chain in which a seal mechanism is interposed between an inner plate and an outer plate to prevent leakage of lubricant, e.g., lubricant oil, grease and solid lubricant material, charged into a bearing portion composed of an outer circumferential surface of a pin and an inner circumferential surface of a bushing and to prevent foreign matters such as dusts from entering the bearing portion from the outside.

BACKGROUND OF THE INVENTION

Transmission chains known as "seal chains" have been used for power transmission, and other applications such as conveyor applications, in dusty atmospheres. In a seal chain, seals are disposed between the inner and outer plates of the chain in order to prevent leakage of lubricant from, and to prevent entry of dust and other foreign matter into, the load-bearing interface between outer circumferential surfaces of the connecting pins of the chain and the inner circumferential surfaces of the bushings through which the connecting pins extend.

Annular elastic seals such as O-rings have been used. An improved seal, as shown in FIG. 5, is disclosed in laid-open Japanese Patent Application No. 2005-076681. The improved seal comprises a pair of annular seal members 531 and 532 facing each other between an inner plate 511 and an outer plate 521 of a chain. The facing surfaces of the annular seal members 531 and 532 have annular lip-like portions 531a and 532a and annular recesses 531b and 532b. Edges of the annular lip-like portions 531a and 532a are pressed by the elasticity of the seal members 531 and 532 against the bottoms of the annular recesses 531b and 532b so that the edges of the lip-like portions 531a and 532a slide against the bottoms of the annular recesses 531b and 532b when the seal chain bends.

In another seal mechanism, disclosed in laid-open Japanese Patent Application No. 2008-157423 and shown in FIG. 6, an annular seal-receiving member 632, composed of steel is fitted on and fixed to a connecting pin 622, and contacts an inner surface of an outer plate 621 of a chain. A disc-shaped part 632a of the seal-receiving member is interposed between an end surface of a bushing 612 and the inner surface of the outer plate 621 and having a disc-like seal receiving portion 632a. A rim 632b on the outer circumferential part of the seal-receiving member 632 extends toward an inner plate 611. A first elastic seal ring 631, fitted to the outer circumferential surface of the bushing 612, is interposed between the annular seal-receiving member 632 and the inner plate 611. A seal ring 633, also composed of steel, disposed to the outside of the annular seal receiving member 632 contacts with the outer side surface of the inner plate 611, and a second elastic seal ring 634 is sandwiched between the inner circumferential surface of the seal ring 633 and the outer circumferential surface of the rim 632b.

The seal mechanism of FIG. 5 comprises a large number of parts and requires time-consuming adjustment of the relative positions of the annular seal members 531 and 532 when inserting the lip-like portions 531a and 532a into the annular recesses 531b and 532b. The positions of the seal members, and of the ring member which fits loosely around the outer circumferences of the seal members, are not stable, and consequently there is a possibility of leakage of lubricant through paths between the seal members and the plates on which they are disposed.

In the seal mechanism of FIG. 6, the annular seal-receiving member 632 is pressed tightly against the inner surface of the outer plate 621 by the elastic seal ring 634. However, ring 634 is not fixed either to ring 633 or to seal-receiving member 632. Lubricant adheres to the elastic seal ring 632, and, as the ring 634 wears, its sealing performance deteriorates as it slides relative to the ring 633 and the seal-receiving member 632.

Furthermore, because the annular seal-receiving member 632 can slide on the inner surface of outer plate 621, the inner surface of plate 621 can wear and lose strength.

SUMMARY OF THE INVENTION

Accordingly, an aim of the invention is to address the above-mentioned problems by providing a seal chain capable of maintaining a high sealing function over a long of time, and of exhibiting superior strength and reduced wear.

The seal chain in accordance with the invention comprises inner and outer links articulably connected to one another in alternating relationship. Each of the inner links comprises a pair of inner plates in laterally spaced relationship to each other and a pair of bushings press fit into bushing holes in the inner plates and protruding therefrom. Each of the outer links comprises a pair of outer plates in laterally spaced relationship to each other and a pair of connecting pins press fit into pin holes in the outer plates. The plates of each outer link overlap the plates of each inner link, and each of the pins of each outer link extend rotatably through a bushing of an adjacent inner link. The seal chain also comprises seal mechanisms disposed between overlapping parts of the inner and outer plates. Each seal mechanism comprises a first seal member in contact with an outer side of an inner plate, and a second seal member in contact with an inner surface of an outer plate facing the inner plate. The first seal member comprises a pair of annular lips, and the second seal member has a surface in sliding contact with the pair of lips.

Since the lips are only on the first seal member, relative sliding between the inner plate and the first seal member or between the outer plate and the second seal member is considerably reduced. Accordingly, because wear of the outer and inner plates is reduced, it becomes possible to reduce deterioration of the strength of the chain and to prolong the life of the chain. Moreover, because the areas contacted by the lips formed of the first seal member are planar areas of the second seal member, and not grooves, it is easy to position the first and second seal members, and assembly can be carried out more efficiently.

In a preferred embodiment, the first seal member can have annular grooves on a surface thereof in contact with the inner plate and the second seal member can have annular grooves on a surface thereof in contacting with the outer plate. A charge of lubricant can be provided in each of the annular grooves, and the first seal member can be adhered to an outer surface of the inner plate and the second seal member can be adhered to an inner surface of said outer plate. Because the lubricant displaces air from the annular grooves adhesion between the respective plates and the respective seal members is enhanced, and sliding between the inner plate and the first seal member, and between the outer plate and the second seal member is reduced. Consequently, it becomes possible to reduce the wear of the inner and outer plates further and to reduce deterioration of strength of the chain over time.

At least one of the first and second seal members can be formed of an elastic synthetic resin. A separate pressing member, such as required in the case of a rigid seal member, becomes unnecessary, and consequently it becomes possible to reduce the numbers of parts, and to carry out assembly more efficiently, both of these advantages leading to a reduction in the cost of the seal chain.

In a preferred embodiment, the second seal member comprises an annular wall on an outer circumferential portion thereof, the wall substantially closing the gap between the outer plate and the inner plate. The annular wall can prevent leakage of the charge of lubricant from the interface between the inner circumferential surface of the bushing and the outer circumferential surface of the connecting pin. It can also prevent the first and second seal members from being damaged entry of particles or other foreign matter.

In a preferred embodiment, the first seal member is press-fit onto an end portion of a bushing. In this way, the first seal member is securely fixed to the outer side of the inner plate. Accordingly, because it becomes possible to prevent relative movement between the inner plate and the first seal member, it becomes possible to avoid wear of the inner plate, to prevent resulting deterioration of the strength of the chain, and to prolong the useful life of the chain.

In a preferred embodiment, an annular seal ring, integrally fixed to an outer circumferential portion of the second seal member, is press-fit into a groove provided on an inner surface of the outer plate. In this way, the second seal member is securely fixed to the inner side of the outer plate. Accordingly, because it becomes possible to prevent the second seal member from sliding relative to the outer plate, to prevent deterioration of the strength of the chain, and to prolong the life of the chain.

The surface of the second seal member that is in sliding contact with the lips of the first seal member preferably has an annular projection extending between the lips of the first seal member to form a labyrinth. The labyrinth helps to prevent leakage of lubricant from the interface between the bushing and the connecting pin, and to prevent entry of foreign matter into and through the seal mechanism.

An alternative embodiment of the invention can have one or both of the following features. According to the first feature, the diameter of an outer circumferential part of the first seal can increases progressively, proceeding toward the inner plate so that the outer circumferential part meets an outer surface of the inner plate at an acute angle. According to the second feature, the diameter of an inner circumferential part of the second seal can decreases progressively, proceeding toward the outer plate so that the inner circumferential part meets an inner surface of the outer plate at an acute angle. The outer circumference part the first seal member is pressed against, and adheres to, the outer surface of the inner plate, preventing infiltration of foreign matter between the first seal member and the inner plate. Similarly, the inner circumferential part of the second seal member is pressed against the inner surface of the outer plate, preventing lubricant from leaking though a path between the second seal and the outer plate.

DETAILED DESCRIPTION OF THE PREFERRED EMBODIMENTS

Figure 1:
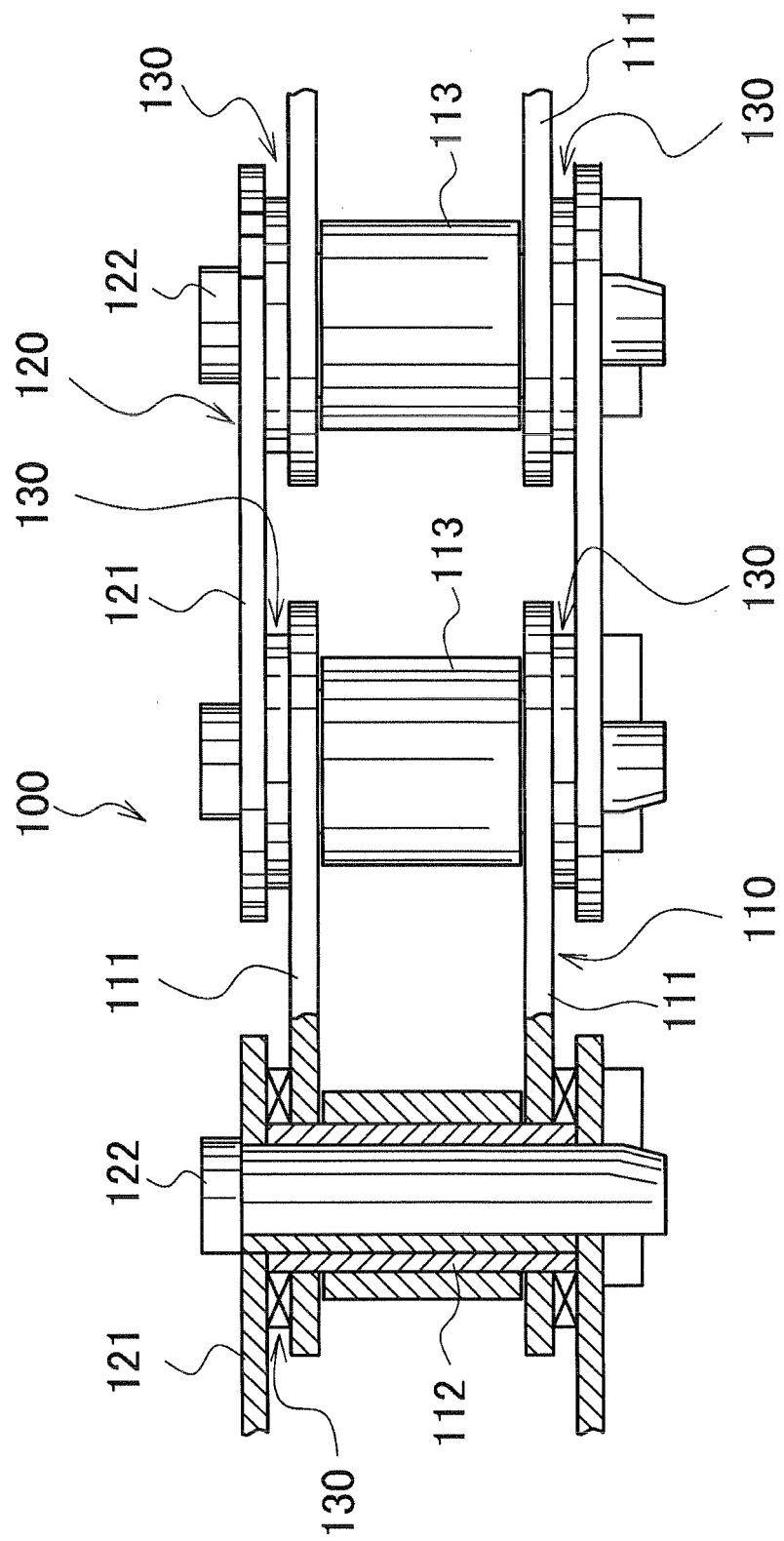
FIG. 1 is a schematic plan view, partly in section, of a seal chain according to a first embodiment of the invention.
Figure 2:
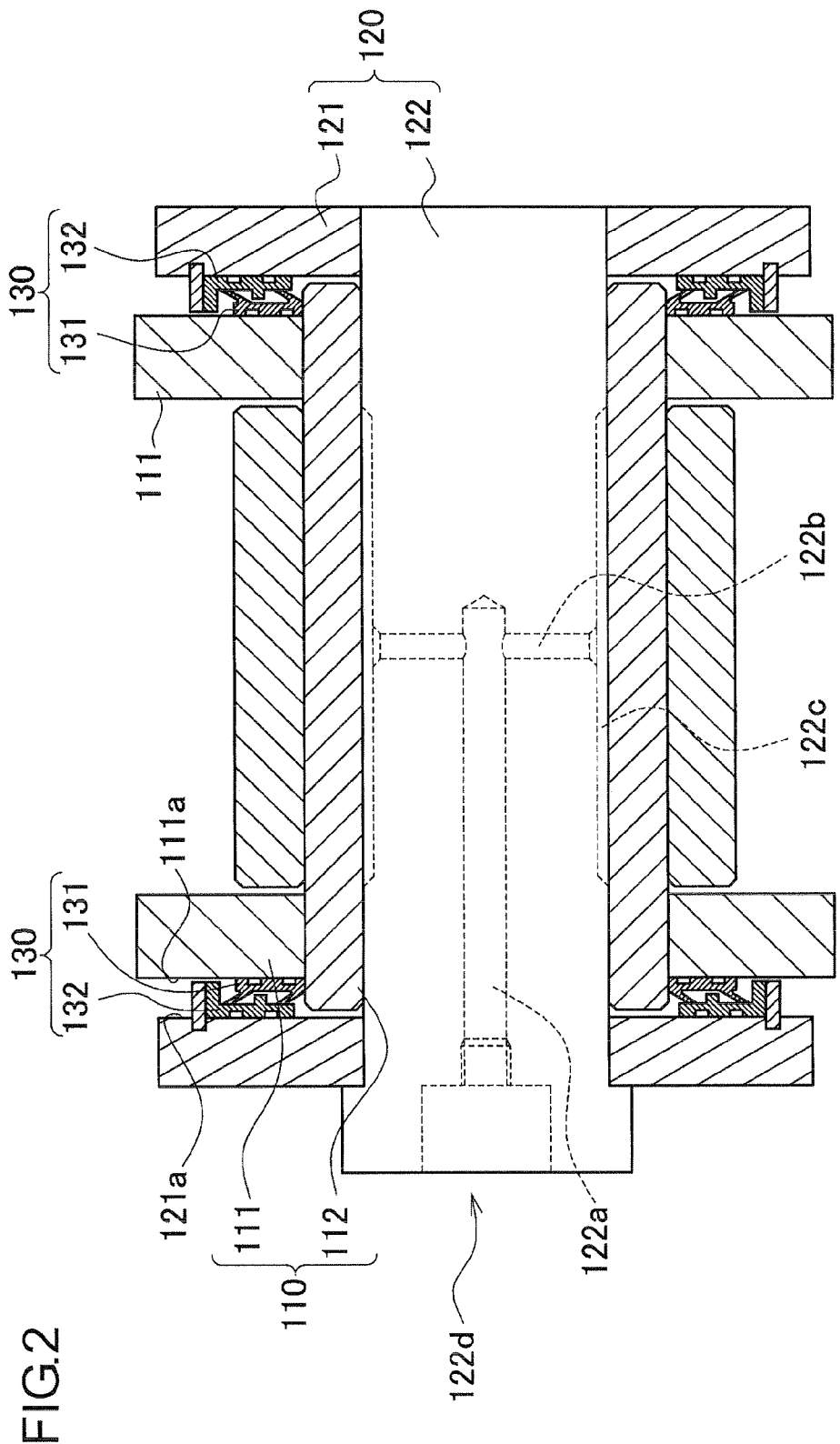
FIG. 2 is a cross-sectional view of a part of the seal chain shown in FIG. 1.
Figure 3:
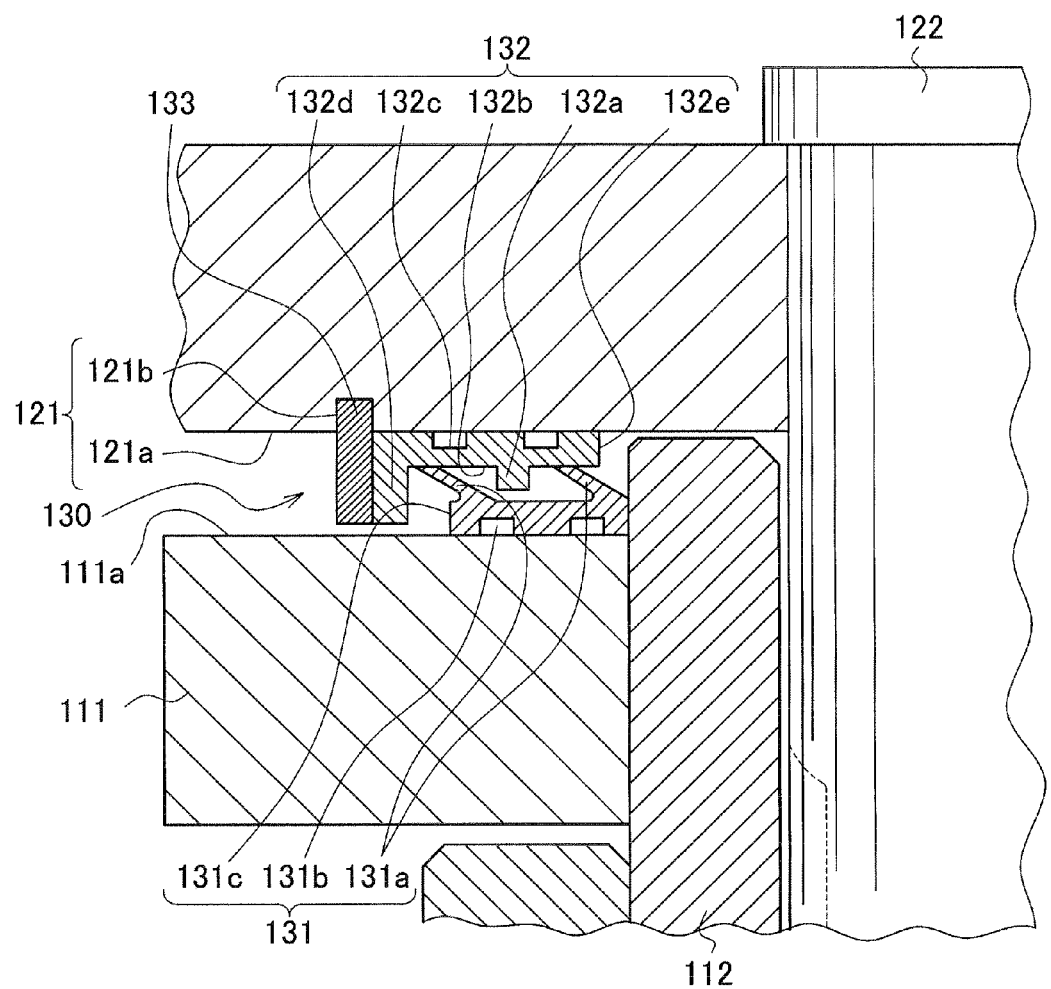
FIG. 3 is an enlarged cross-sectional view of a part of the seal chain shown in FIG. 2.

As shown in FIGS. 1 through 3, a seal chain 100 according to a first embodiment of the invention has inner links 110 and outer links 120 connected to one another in alternating arrangement along the length of the chain.

Each inner link 110 comprises a pair of laterally spaced inner plates 111, a pair of cylindrical bushings 112 press-fit into the inner plates 111 with both end of each bushing protruding beyond the inner plates, and rollers 113, surrounding the parts of the bushings between the inner plates 111, and rotatable thereon.

Each outer link 120 comprises of a pair of laterally spaced outer plates 121. These outer plates overlap the inner plates of adjacent inner links on the outsides thereof. Connecting pins 122, which are press-fit into pin holes in the outer plates, extend rotatably through bushings 112, allowing for articulation of the connected inner and outer links.

Seals 130 are disposed between the inner plates 111 and the outer plates 121. As shown in FIG. 2, the seals are disposed between the outer sides 111a of the inner plates 111 and the inner sides 121a of the outer plates 121.

As shown in FIG. 2, the pin 122 has internal oil passages 122a and 122b and concave grooves 122c, formed on the outer circumferential surface thereof and communicating with the oil passage 122b. The passages and grooves of the pin 122 supply grease, oil, or other lubricant, from an opening 122d at one end of the pin, through passages 122a and 122b and grooves 122c, to the interface between the inner circumferential surface of the bushing 112 and the outer circumferential surface of the pin 122. The concave grooves 122c on the outer circumferential surface of the pin 122 are not always necessary for adequate lubrication.

As shown in FIG. 2, each seal 130 comprises a first seal member 131, press-fit onto the end portion of a bushing 112 and a second seal member 132, integrated with a ring 133 that is press-fit into an annular groove formed on the inner side 121a of an outer plate. The second seal member 132 can be integrated with the ring 133 by being baked onto the ring with the application of heat. This ring 133 is also not always necessary, and other means may be used to adhere the second seal member 132 to the inner side 121a of the outer plate.

As shown in FIG. 3, two lips 131a are formed on the outward-facing side of the first seal member 131. These lips, which are generally frusto-conical in shape, extend outward at an oblique angle toward, and into contact with, the second seal member.

Two coaxial annular grooves, one of which is groove 131b, are formed on the inward facing surface of the first seal member 131, i.e., on the surface that contacts the inner plate 111. A charge of lubricant such as grease is placed into these annular grooves 131b before the first seal member 131 is press-fit onto the end portion of bushing 112. The charge of grease eliminates air from between the inner plate 111 and the first seal member 131, causing the first seal member 131 to adhere tightly to the surface 111a of inner plate 111. Accordingly, it becomes possible to prevent the inner plate and first seal member from sliding relative to each other.

The annular lips 131a on the first seal member 131 are in sliding contact with surface 132b of the second seal member, which faces the first seal member 131.

An annular projection 132a on surface 132b of the second seal member is located between the lips 131a of the first seal member 131.

Two coaxial annular grooves, one of which is groove 132c, are formed the surface of the second seal member 132 that contacts the outer plate 121. Here, as in the case of the first seal member, a charge of lubricant such as grease is placed into grooves 132c before the second seal member 132 is attached to plate 121 by press-fitting ring 133 into groove 121b. The charge of grease eliminates air from between the outer plate 111 and the second seal member 132, causing the second seal member 132 to adhere tightly to the surface 121a of outer plate 121. Accordingly, it becomes possible to prevent the outer plate and second seal member from sliding relative to each other.

The seal members are pressed against the respective plates by reaction to the elastic deformation of the lips of the first seal member, so that the adhesion of the seal members to the plates is enhanced.

The second seal member 132 is provided with an annular wall 132d at its outer circumference. This wall has a height nearly equal to the spacing between the inner and outer plates, closes off the gap between the inner plate 111 and the outer plate 121, thereby assisting the seal members in preventing leakage of lubricant from the space between the inner circumferential surface of the bushing 112 and the outer circumferential surface of the connecting pin 122.

A polyurethane resin is preferably used for the first seal member 131 and NBR (nitrile rubber) is used for the second seal member 132, any of many other synthetic resin materials having the requisite resilience, oil resistance, and wear resistance may be used.

If the ring 133 is formed of a hard material such as steel, it can block dust and thereby prevent the respective seal members from being damaged by dust even if the chain is used in a dusty environment.

The seal structure, in which a first seal member has a pair of annular lips in sliding contact with a surface of a second seal member can maintain an effective seal over a long time, and enhance the strength and endurance of the chain by reducing wear. The use of elastic bodies as the first and second seal members, and the formation of an oil film between the seals using a highly fluid lubricant, also contributes to the reduction of wear and prolongation of the life of the seal members.

The projection 132a on the second seal member 132 cooperates with the lips 131a of the first seal member to form a labyrinth structure, which assists in preventing leakage of lubricant from the space between the inner circumferential surface of the bushing and the outer circumferential surface of the connecting pin, and in preventing entry of foreign matter into this space. The labyrinth structure assists in preventing leakage of lubricant and entry of foreign matter even if the lips of the first seal member have become worn. The seal configuration is simple and the seal chain can therefore be produced easily and inexpensively. A second embodiment of the seal chain of the invention will be explained with reference to FIG. 4. The second embodiment is different from the first embodiment described above only in the shapes of the end portion of the first and second seal members. Parts of the second embodiment that are identical to parts of the first embodiment are designated by reference numbers exceeding by 100 the reference numbers of the corresponding parts in the first embodiment.

Figure 4:
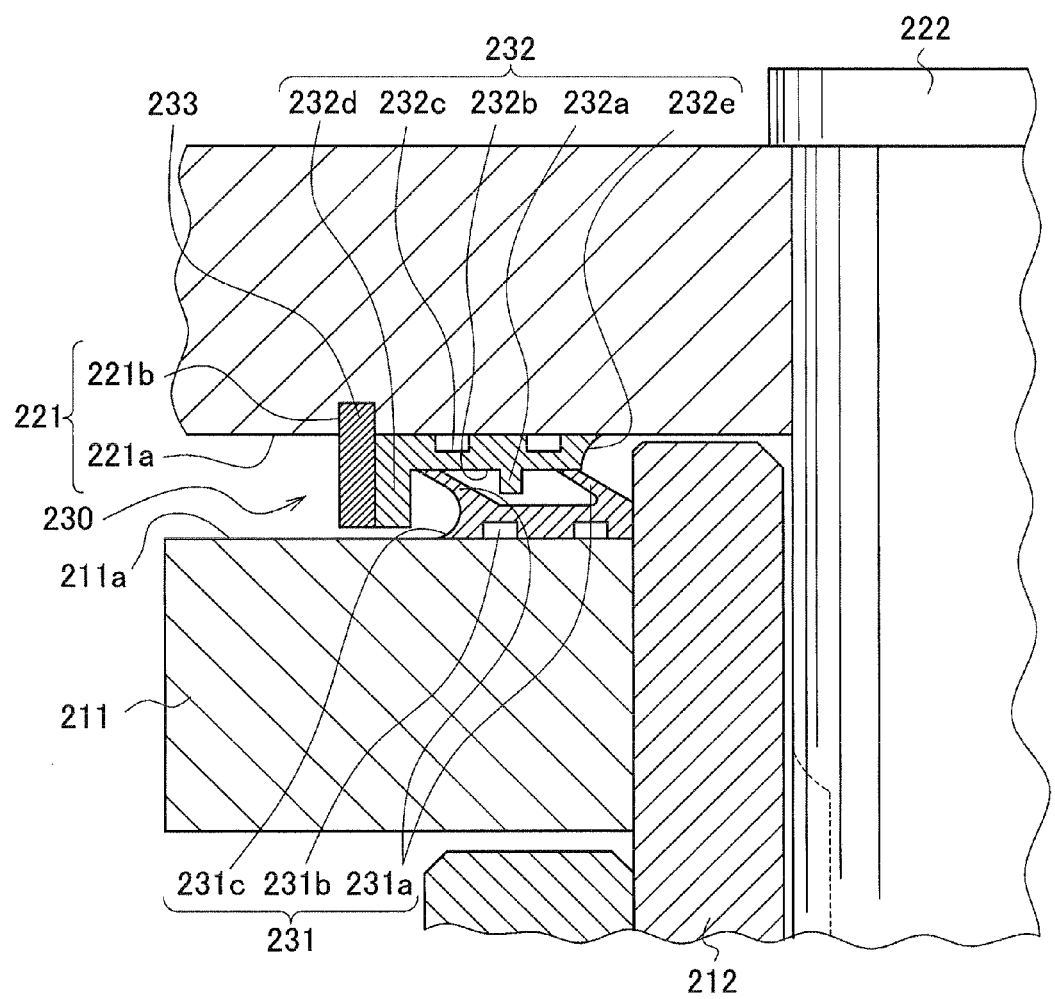
FIG. 4 is an enlarged cross-sectional view of a part of a seal chain according to a second embodiment of the invention.
Figure 5:
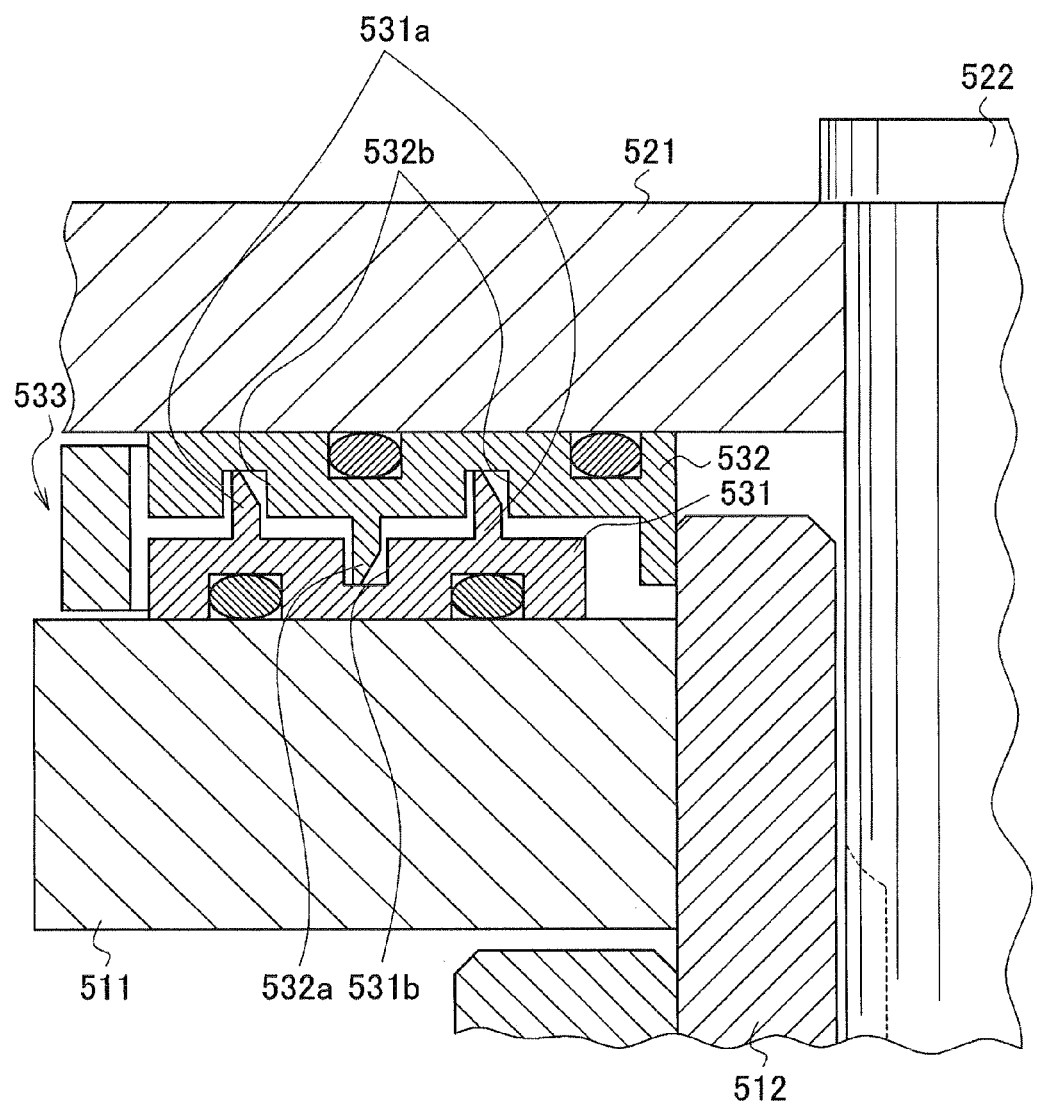
FIG. 5 is an enlarged cross-sectional view of a part of a first prior art seal chain.
Figure 6:
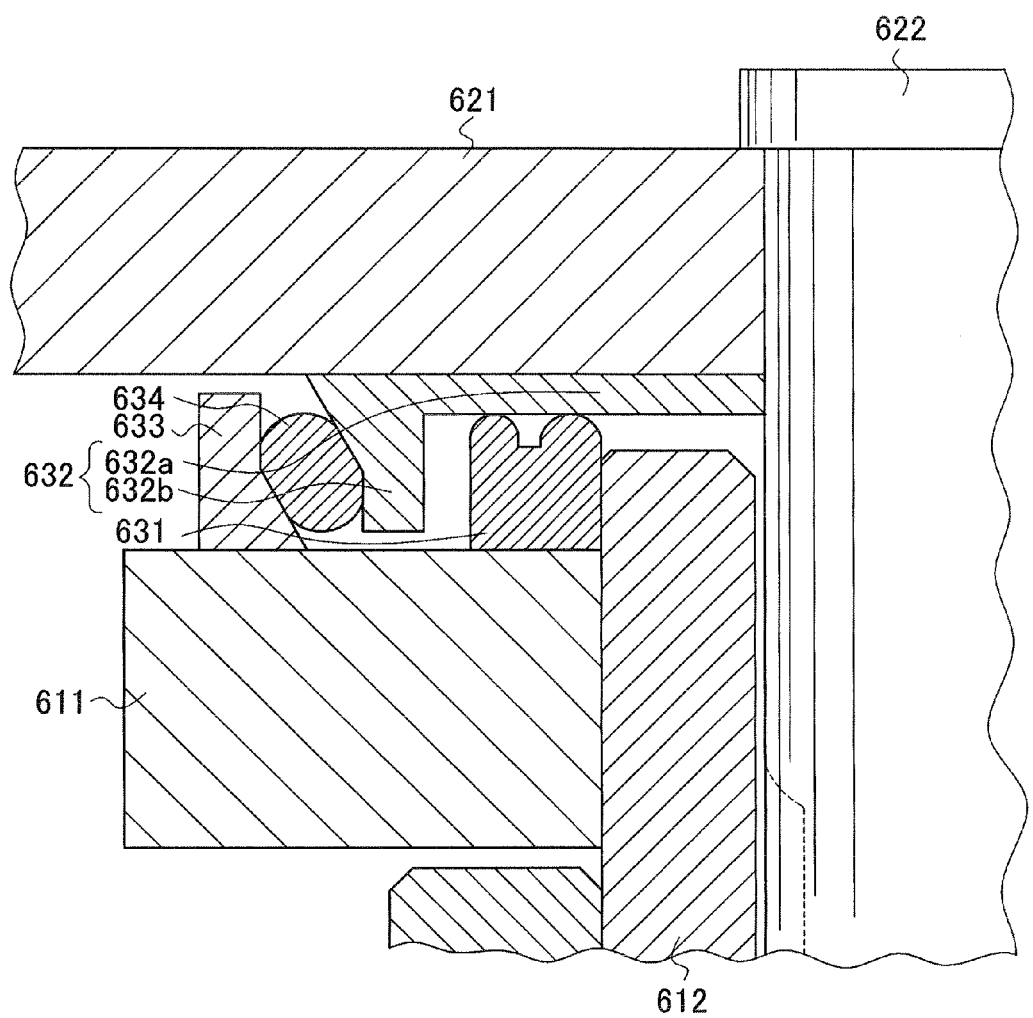
FIG. 6 is an enlarged cross-sectional view of a part of a second prior art seal chain.

As shown in FIG. 4, in the seal mechanism 230 of the second embodiment, the outer circumferential surface 231c of the first seal member 231 has a diameter that becomes progressively larger proceeding toward the surface 211a of the inner plate 211.

When foreign matter entering from the outside contacts the surface 231c, pressure applied by the foreign matter acts in a direction such that the seal member 231 is pressed against surface 211a of the inner plate 211. Accordingly, the adhesion of the first seal member 231 with the outer side surface 211a of the inner plate 211 is enhanced when foreign matter infiltrates the seal.

Furthermore, as shown in FIG. 4, diameter of the inner circumferential surface 232e of the second seal member 232 becomes progressively smaller proceeding toward the outer plate 221. Consequently, surface 232e of the outer seal meets the inner surface 221a of the outer plate 221 at an acute angle.

When the pressure of the lubricant in the space between the inner circumferential surface of bushing 212 and the outer circumferential surface of connecting pin 222 rises, the end surface 232e of the second seal member 232 is pressed against, and adheres more strongly to, plate surface 221a.

The seal chain according to the second embodiment has all of the advantages of the first embodiment. In addition, because the outer circumferential surface 231c is formed with a progressively increasing diameter proceeding toward the inner plate 211, adhesion between the first seal member 231 and surface 211a of the inner plate 211 is enhanced when the foreign matter infiltrates the seal, and entry of foreign matter between the first seal member 231 and the outer surface 211a of the inner plate 211 is prevented. Accordingly, good sealing performance is maintained over a long period of time.

Furthermore, because the inner circumferential surface 232e of the second seal member 232 has a decreasing diameter proceeding toward surface 221a of the outer plate, adhesion of the second seal member 232 to the outer plate 221 is enhanced. Accordingly, good lubrication performance of interface between the bushing and the connecting pin can be maintained for a long time.

The chain can be a roller chain in which a roller is fitted around a bushing, or a rollerless bushing chain, as long as the seal mechanism may be disposed between the inner plates and the outer plates of the chain. The numbers of coaxial annular grooves formed in the first and second seal members can be varied according to factors such as the size of the chain, and the properties of the lubricant.

The first and second seal members are preferably molded from elastic synthetic resins, preferably rubber-type materials such as nitrile rubber (NBR), urethane rubber (polyurethane), chloroprene rubber, or fluorine rubber (a copolymer of propylene hexafluoride and vinylidene fluoride). The choice of appropriate materials will depend on considerations of factors such as wear resistance, oil resistance, and heat resistance.

While the lip may be formed into various shapes, it is preferable to form the lip so as to have a triangular or circular section so that the edge portion thereof that contacts with and slides the sliding surface formed in the first seal member has an acute angle because it excels in terms of the durability and sealing effect.

For wear resistance, it is preferable to adopt a relatively hard material such as urethane rubber for the first seal member on which the resilient lips are formed, while the second seal member, which is in sliding contact with the resilient lips of the first seal member, is preferably formed from a relatively soft material such as NBR rubber.

Any means may be used to integrate the annular seal ring, 133 or 233, with the second seal member, as long as it is capable of effecting a strong and durable connection. Baking or adhesive are preferred because of their simplicity.

What is claimed is:

1. A seal chain, comprising:
   inner and outer links articulably connected to one another in alternating relationship;
   wherein each of said inner links comprises a pair of inner plates in laterally spaced relationship to each other and a pair of bushings press fit into bushing holes in said inner plates and protruding therefrom;
   wherein each of said outer links comprises a pair of outer plates in laterally spaced relationship to each other and a pair of connecting pins press fit into pin holes in said outer plates;
   wherein the plates of each outer link overlap the plates of each inner link, and each of the pins of each outer link extend rotatably through a bushing of an adjacent inner link;
   the seal chain also comprising:
   seal mechanisms disposed between overlapping parts of said inner and outer plates;
   wherein each said seal mechanism comprises a first seal member in contact with an outer side of an inner plate and a second seal member in contact with an inner surface of an outer plate facing said inner plate;
   wherein said first seal member comprises a pair of annular lips;
   wherein said second seal member has a surface in sliding contact with said pair of lips;
   wherein said first seal member has annular grooves on a surface thereof in contact with said inner plate and said second seal member has annular grooves on a surface thereof in contacting with said outer plate,
   wherein a charge of lubricant is provided in each of said annular grooves, and
   wherein said first seal member is adhered to an outer surface of said inner plate and said second seal member is adhered to an inner surface of said outer plate.

2. The seal chain according to claim 1, wherein at least one of said first and second seal members member is formed of an elastic synthetic resin.

3. The seal chain according to claim 1, wherein said second seal member comprises an annular wall on an outer circumferential portion thereof, said wall substantially closing the gap between said outer plate and said inner plate.

4. The seal chain according to claim 1, wherein said first seal member is press-fit onto an end portion of a bushing.

5. The seal chain according to claim 1, including an annular seal ring integrally fixed to an outer circumferential portion of said second seal member and press-fit into a groove provided on an inner surface of said outer plate.

6. The seal chain according to claim 1, wherein said surface of said second seal member has an annular projection extending between said lips of the first seal member whereby said annular projection and said lips form a labyrinth.

7. The seal chain according to claim 1, wherein the diameter of an outer circumferential part of said first seal progressively increases proceeding toward said inner plate, whereby said outer circumferential part meets an outer surface of said inner plate at an acute angle.

8. The seal chain according to claim 1, wherein the diameter of an inner circumferential part of said second seal progressively decreases, proceeding toward said outer plate, whereby said inner circumferential part meets an inner surface of said outer plate at an acute angle.

* * * * *